July 16, 1935.  G. H. KRIEGER  2,008,455
PNEUMATIC TIRE PRESSURE CONTROL
Filed Sept. 26, 1934      4 Sheets-Sheet 3

Inventor
George H. Krieger
By *Clarence A. O'Brien*
Attorney

July 16, 1935.   G. H. KRIEGER   2,008,455
PNEUMATIC TIRE PRESSURE CONTROL
Filed Sept. 26, 1934    4 Sheets-Sheet 4

Inventor
George H. Krieger
By Clarence A. O'Brien
Attorney

Patented July 16, 1935

2,008,455

UNITED STATES PATENT OFFICE 2,008,455

PNEUMATIC TIRE PRESSURE CONTROL

George H. Krieger, Mason City, Iowa

Application September 26, 1934, Serial No. 745,632

5 Claims. (Cl. 152—11)

This invention relates to means for automatically controlling the air pressure in a pneumatic tire, the general object of the invention being to provide means carried by each wheel and operated by the rotary movement of the wheel for introducing air into the tire of the wheel with automatic means including a pressure gauge, which is adjustable, for regulating the amount of air introduced into the tire.

Another object of the invention is to provide signal means for notifying the driver of the motor vehicle that the device is in working order.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which.

Figure 1:
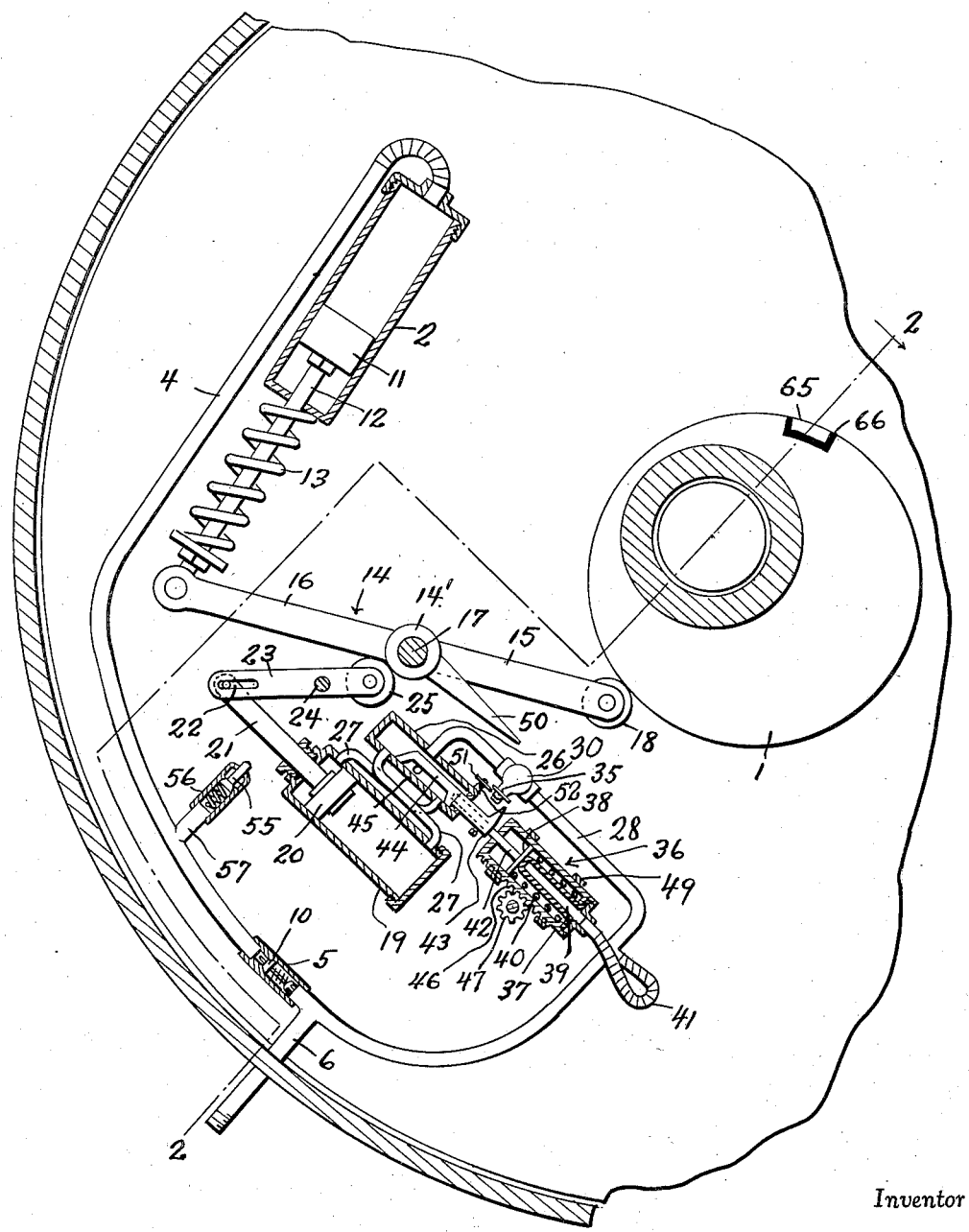
Fig. 1 is a fragmentary sectional view through parts of a brake drum of a wheel with the principal parts of the invention therein.
Figure 2:
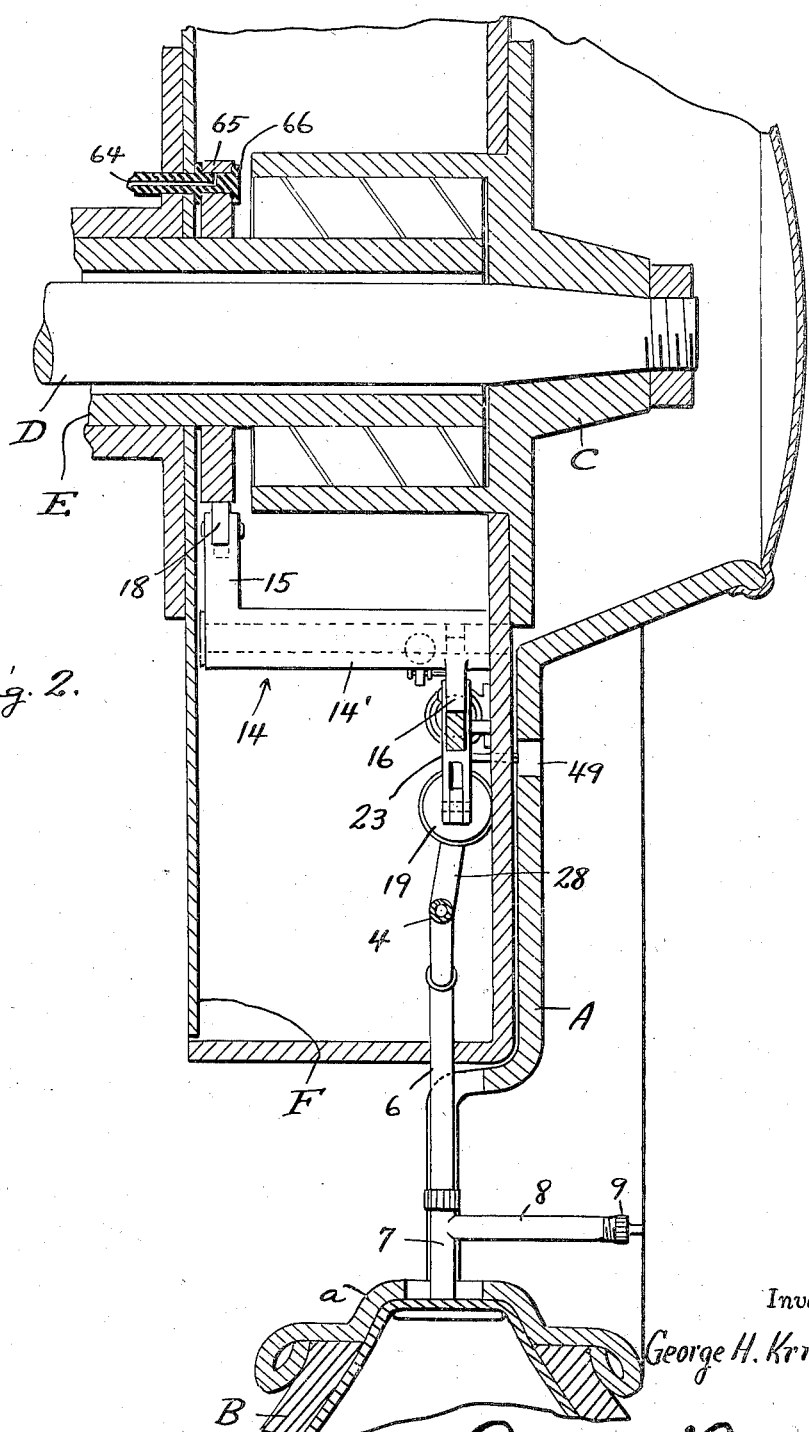
Fig. 2 is a section on line 2—2 of Fig. 1.

In these drawings, the letter A indicates the wheel provided with the rim $a$ which carries the tire B, the hub of the wheel being shown at C, the letter D indicating a part of an axle and the letter E indicating the axle housing, and the brake drum is shown at F.

In carrying out my invention, I place a cam or eccentric 1 on that part of the housing which is located in the brake drum so that this cam or eccentric is stationary and I pivot a pump cylinder 2 in the brake drum, the pivotal point being shown at 3 and one end of this pump has one end of a hose or pipe 4 attached thereto, the other end of the pipe being connected by a valve casing 5 to a tube 6 which extends from a part of the periphery of the drum and is connected by a suitable coupling to the stem 7 of the inner tube of the tire, this stem not having a valve therein, but the stem is provided with a lateral extension 8 which has the usual valve therein and the outer end of the extension 8 carries the usual cap 9. Thus, if the device forming the subject matter of this invention is not to be used for any reason, the tire can be inflated in the usual manner through the extension 8 and stem 7.

A spring-pressed valve 10 is located in the casing 5 and closes towards the pump so as to prevent pressure in the tire returning to the pump.

The pump is provided with the usual piston 11, the rod 12 of which passes through the opposite end of the pump and has a spring 13 thereon which tends to hold the piston in retracted position. A lever 14 includes a centrally arranged elongated tubular part 14' and the arms 15 and 16 and is rockably supported in the drum by a stationary pin 17 which passes through the tubular part 14' and has one end connected to a part of the drum. The arm 15 carries a roller 18 which engages the cam or eccentric 1 and the outer end of the arm 16 is forked and pivoted to the outer end of the piston rod 12. Thus, as the wheel revolves, the roller 18 will roll around the cam or eccentric 1 and thus the lever 14 will be rocked so that this rocking movement of the lever with the spring 13 will reciprocate the piston of the pump.

Figure 3:
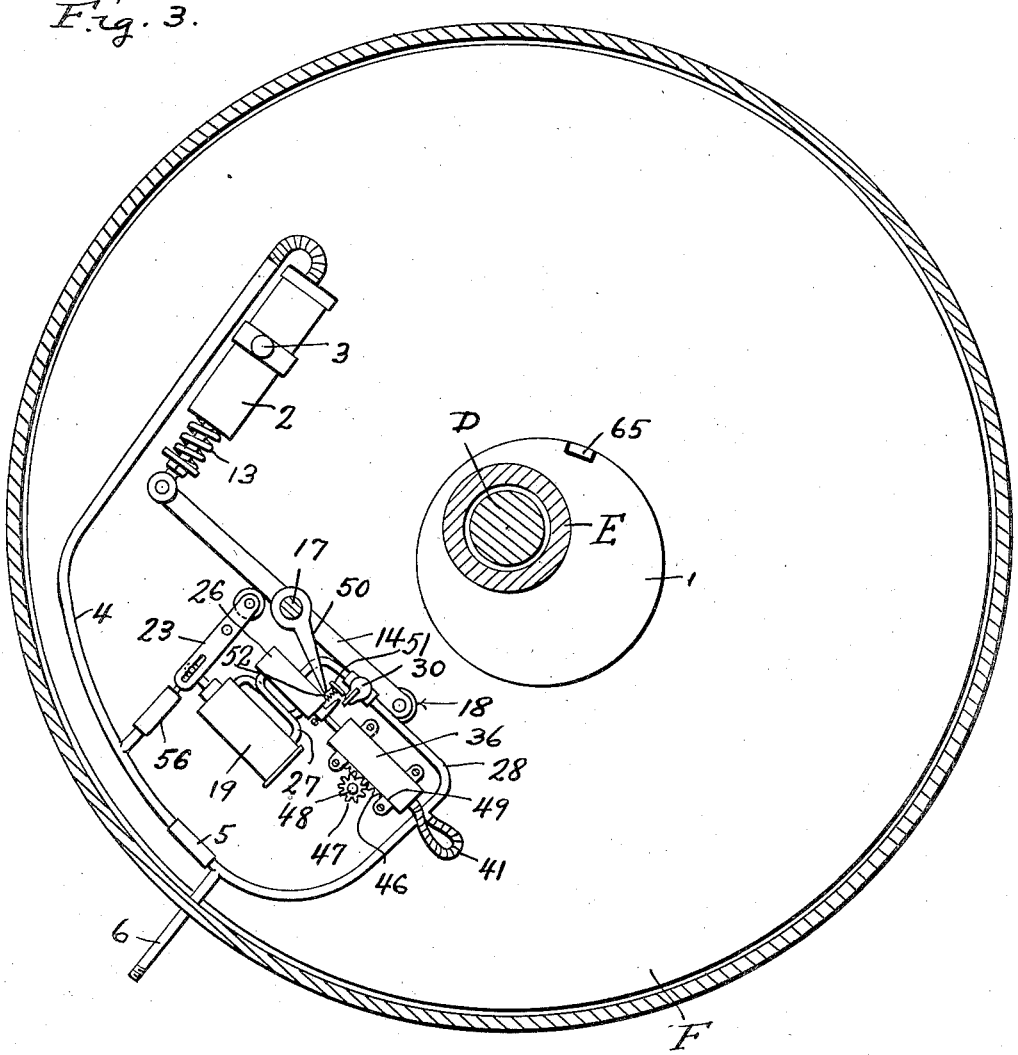
Fig. 3 is a sectional view through the brake drum of a wheel and the axle and showing the principal parts of the invention in elevation.

A cylinder 19 is carried by the drum and contains a piston 20, the rod 21 of which is connected by a pin and slot connection 22 to one end of a lever 23 pivoted intermediate its ends to the brake drum as shown at 24. The opposite end of the lever carries a roller 25. These parts are so formed that when the piston 20 is in the rear part of the cylinder 19, the lever 23 is rocked to a position where its roller 25 will rock the lever 14 so as to move the roller 18 away from the cam or eccentric 1, as shown in Fig. 3 so that the device will be rendered inoperative. When the piston 20 is in its other position, the roller 25 will lie close to the sleeve or tubular part 14' so that it will not interfere with the rocking movement of the lever 14 under the action of the cam 1 as shown in Fig. 1.

Figure 4:
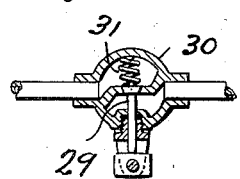
Fig. 4 is a sectional view through the main valve.
Figure 5:
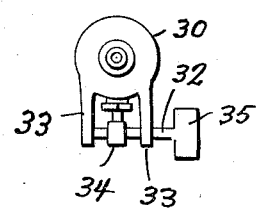
Fig. 5 is an end view of said valve.

A valve chest 26 is located in the drum adjacent the cylinder 19 and a pair of pipes 27 each connect one end of the chest to an opposite end of the cylinder 19 and said chest is connected by a pipe 28 with that part of the line leading from the pump to the valve stem or tube 6 at the junction of the line with the tube 6 so that air from the pump or from the tire will pass through the pipe 28 into the valve chest. The flow of air through the pipe 28 into the chest is controlled by a spring-pressed valve 29 located in the casing 30 which is connected in the pipe line 28, spring 31 of the valve normally holding it closed. A stub shaft 32 is journaled in the arms 33 of the valve casing 30 and carries a substantially block-like cam 34 which is of greater length than width so that when the cam is lengthwise, it will hold the valve open but when turned a quarter turn, the valve will be closed by the spring as shown in Fig. 4. A substantially rectangular-shaped head 35 is connected to the outer end of the shaft 32 as shown in Fig. 5.

A tire gauge 36 is adjustably arranged in the brake drum and consists of a cylinder 37 having a piston 38 therein, a resilient tubular part 39 and a spring 40 encircling the tubular part 39 as shown in Fig. 1. A flexible pipe 41 connects a portion of the pipe 28 with the tubular part 39 so that air from the pipe 28 will enter the resilient tubular part, thus expanding the same against the action of the spring 40 which has one end connected with one end of the cylinder and its other end to the piston 38 thus this spring resists outward movement of the piston 38 by the expansion of the resilient tubular part 39.

The rod 42 of the piston 38 is adjustably connected to the stem 43 of a slide valve 44 located in the chest 26, the valve being of hollow construction to expose an exhaust port 45 in the chest. As will be seen, the expansion of the tubular part 39 of the gauge will move the slide valve 44 to the far end of the chest while the spring 40 will return the slide valve to the opposite side of the chest, when the tubular part 39 contracts so that these two movements of the slide valve will first connect one end of the cylinder 19 with the chest and the other end with the exhaust port 45 through means of the pipes 27 and when the valve has been moved to the opposite position, the opposite end of the cylinder will be connected with the chest and the other end with the exhaust port. As will be seen, with the parts in the position shown in Fig. 1, when air is entering the chest through the pipe 28, the air will pass through a pipe 27 into the closed end of the cylinder 19 to move the piston 20 to the position it occupies in Fig. 1, the other end of the cylinder exhausting through the other pipe 27 and the exhaust port 45. When the slide valve is in the opposite position, the air will be led into the cylinder 19 from that end in which the rod 21 passes so that the piston 20 will be moved to the opposite end of the cylinder while air from the other side of the piston is exhausting through the port 45.

As before stated, the gauge 36 is adjustable so that the device will maintain the desired amount of air pressure in the tire and this adjustment is provided for by providing a rack 46 on the cylinder which is engaged by a pinion 47 on a shaft 48 journaled in the brake drum and having its outer end provided with a handle or a wrench receiving part which is exposed through an opening 49 in the wheel so that this shaft can be adjusted by a key or the like in order to adjust the position of the gauge 36. The gauge is slidably supported in the drum by the straps 49 encircling the same.

Figure 6:
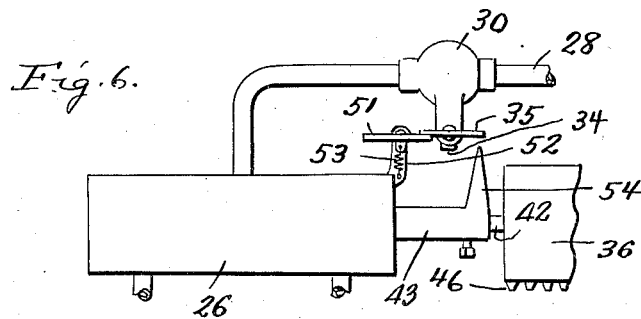
Fig. 6 is a view of the slide valve casing, a part of the gauge and the valve containing pipe leading to the valve casing.
Figure 7:
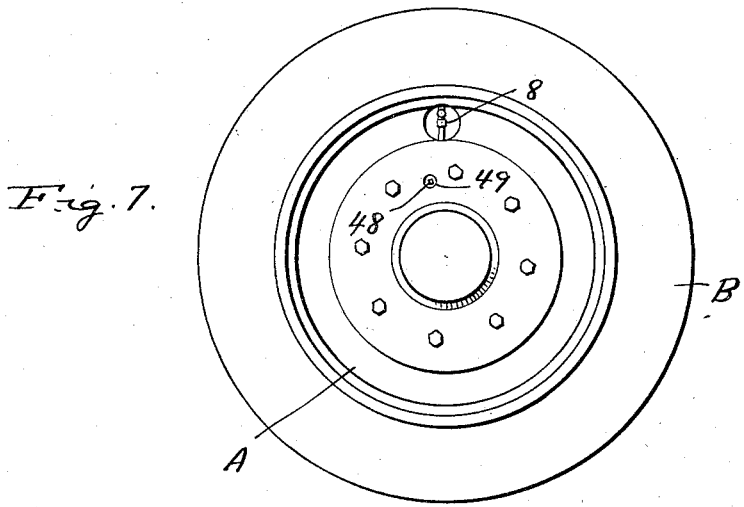
Fig. 7 is an elevation of a wheel equipped with this invention.
Figure 8:
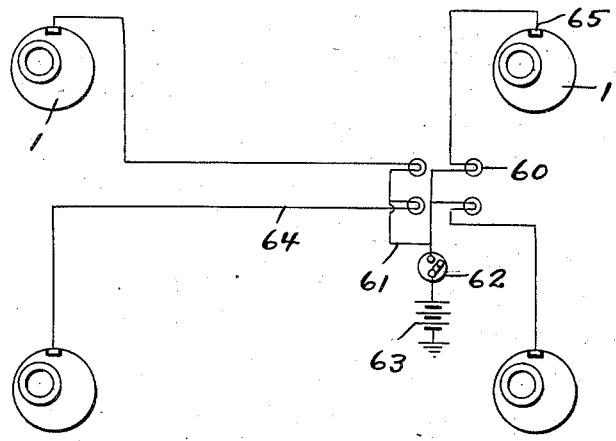
Fig. 8 is a view of the circuits for the signal means.

When the lever 14 moves to inoperative position, as shown in Fig. 3, a finger 50 connected to the tubular part 14' thereof strikes a small lever 51 pivoted on a bracket 52 carried by the chest 26 which causes the lever 51 to engage one end of the head 35 of the shaft 32 so as to cause the cam 34 to move to the position shown in Fig. 4 which will permit the spring 31 to close the valve 29 so that the line 28 is closed and there is no danger of air leaking either in the chest 26 or the cylinder 19 when the parts are in inoperative position. After the finger 50 passes the lever 51, a spring 53 returns it to the position shown in Fig. 6 but after the shaft 32 has been moved by the lever 51, the head 35 of the shaft will be in a position at right angles to the lever 51 as shown in Fig. 3. In this position of the head 35, a projection 54 on the stem 43 of the slide valve 44 will engage the head 35 when the parts move under the action of the spring of the gauge due to the retraction of the tubular part of the gauge and thus the valve will be opened by the cam 34.

A spring-pressed relief valve 55 has its casing 56 connected to a branch 57 of the pipe 4, the spring normally holding the valve closed as shown in Fig. 1, but when the lever 23 is moved to a position to move the lever 14 to inoperative position, a part of the lever 23 will strike the stem of the valve, thus opening the same so that any air in the pump cylinder will escape, the valve 10 preventing escape of air from the part of the line leading to the stem of the tire.

The position of the parts in Fig. 1 occurs after the low pressure in a tire has caused the tubular part 39 of the gauge 36 to contract so that the spring of the gauge will move the slide valve 44 to the right end of the chest and the projection 54 has opened the valve 29 so that air from the tire will enter the chest, flow through the pipe 27 to the right end of the cylinder 19 forcing the piston 20 and the lever 23 to the positions they occupy in Fig. 1. Thus, the spring 13 moves the lever 14 to a position where its roller 18 will engage the cam 1 so that during the rotation of the wheel, the lever 14 will be reciprocated by the cam to operate the pump so that air will be forced into the tire. As the pressure in the tire builds up, the pressure will act on the tubular part of the gauge causing the same to expand until the slide valve 44 is moved to its opposite position and then air will enter the opposite end of the cylinder 19, force the piston 20 rearwardly so that the lever 23 will be moved to the position shown in Fig. 3 so that said lever will move the lever 14 to inoperative position as shown in Fig. 3 and as this occurs, the finger 50 will rock the small lever 51 so as to close the valve 29 to prevent any air entering the chest or the cylinder 19. As the lever 23 moves to the position shown in Fig. 3, it will open the valve 55 so as to drain the pump. Then if the air pressure lowers again, the parts will be moved into operative position so that the tire is again pumped up to the required pressure.

I also provide signal means to notify the driver or other occupant of the motor vehicle that the devices are in operating order and such signal means includes lamps 60, one for each wheel, the lamps being connected by conductors 61 to the ignition switch 62 or any other switch which is connected to the battery 63 of the car and other conductors 64 connect the lamps to contact parts 65 carried by the cams 1 and insulated therefrom as shown at 66. Thus when a roller 18 strikes a contact 65, the circuit to a lamp will be closed and the lamp will light. The flashing on and off of these lamps indicates to the driver that the roller 18 is engaging the cam or eccentric 1 but of course if they fail to flash, after the automobile has been in use for a considerable time and the driver knows that the tires need inflation, he will known that the device is out of order and by providing a signal for each wheel, the operator can tell which wheel has its pumping means out of order.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. Means for inflating the tire of a wheel comprising a pump cylinder carried by a part of the wheel, a piston in the cylinder, a conduit connecting the outlet of the pump with the stem of the tire, a lever supported for rocking movement by a part of the wheel and having one end connected with the piston rod, a stationary cam with which the other end of a lever engages for reciprocating the same, a gauge including a cylinder, an expansible member, a piston and a spring for holding the piston retracted, a conduit connecting the expansible member of the gauge with the tire stem, a second cylinder carried by the wheel, a piston therein, a lever operated by the piston, said lever moving the first mentioned lever to operative and inoperative positions, a valve chest, conduits connecting the same with the ends of the second cylinder, said chest having an exhaust port therein, a pipe connecting the chest to the second mentioned conduits, a slide valve in the chest operated by the gauge for controlling the flow of air through the conduit into the second cylinder.

2. Means for inflating the tire of a wheel comprising a pump cylinder carried by a part of the wheel, a piston in the cylinder, a conduit connecting the outlet of the pump with the stem of the tire, a lever supported for rocking movement by a part of the wheel and having one end connected with the piston rod, a stationary cam with which the other end of a lever engages for reciprocating the same, a gauge including a cylinder, an expansible member, a piston and a spring for holding the piston retracted, a conduit connecting the expansible member of the gauge with the tire stem, a second cylinder carried by the wheel, a piston therein, a lever operated by the piston, said lever moving the first mentioned lever to operative and inoperative positions, a valve chest, conduits connecting the same with the ends of the second cylinder, said chest having an exhaust port therein, a pipe connecting the chest to the second mentioned conduits, a slide valve in the chest operated by the gauge for controlling the flow of air through the conduits into the second cylinder, a valve in the pipe, means for closing the same when the first lever moves to inoperative position, means for opening the same when the expansible member in the gauge contracts, and means for adjusting the gauge.

3. Means for inflating the tire of a wheel comprising a pump cylinder carried by a part of the wheel, a piston in the cylinder, a conduit connecting the outlet of the pump with the stem of the tire, a lever supported for rocking movement by a part of the wheel and having one end connected with the piston rod, a stationary cam with which the other end of a lever engages for reciprocating the same, a gauge including a cylinder, an expansible member, a piston and a spring for holding the piston retracted, a conduit connecting the expansible member of the gauge with the tire stem, a second cylinder carried by the wheel, a piston therein, a lever operated by the piston, said lever moving the first mentioned lever to operative and inoperative positions, a valve chest, conduits connecting the same with the ends of the second cylinder, said chest having an exhaust port therein, a pipe connecting the chest to the second mentioned conduits, a slide valve in the chest operated by the gauge for controlling the flow of air through the conduits into the second cylinder, a valve in the pipe, means for closing the same when the first lever moves to inoperative position, means for opening the same when the expansible member in the gauge contracts, and means for adjusting the gauge, a valve for relieving the pressure in the pump cylinder, a spring for normally holding the same closed, and means for opening the same when the first lever is moved to inoperative position and a spring-pressed valve for preventing the flow of air from the tire and the gauge to the pump.

4. Means for automatically inflating a tire of a wheel comprising a pump carried by the wheel, a conduit connecting the outlet of the pump with the stem of the tire, means for operating the pump by the rotary movement of the wheel, a movable member carried by the wheel for moving the pump operating means to inoperative position, air actuated means for moving said member to operative and inoperative positions, a conduit for connecting the air operated means to the first-mentioned conduit, valve means for controlling the flow of air from the second conduit to the air operated means, a second air operated device for operating the valve means and means for connecting said device to the second conduit.

5. Means for automatically inflating a tire of a wheel comprising a pump carried by the wheel, a conduit connecting the outlet of the pump with the stem of the tire, means for operating the pump by the rotary movement of the wheel, a movable member carried by the wheel for moving the pump operating means to inoperative position, air actuated means for moving said member to operative and inoperative positions, a conduit for connecting the air operated means to the first-mentioned conduit, valve means for controlling the flow of air from the second conduit to the air operated means, a second air operated device for operating the valve means and means for connecting said device to the second conduit, a valve in the second conduit, means for opening the last-mentioned valve when the valve means are in position for admitting air into the air operated means first mentioned and for closing the said valve when the valve means are in position for causing the air from the second conduit to move the movable member to inoperative position.

GEORGE H. KRIEGER.